United States Patent [19]

Piatt et al.

[11] Patent Number: 4,631,550

[45] Date of Patent: Dec. 23, 1986

[54] DEVICE AND METHOD FOR SENSING THE IMPACT POSITION OF AN INK JET ON A SURFACE OF AN INK CATCHER, IN A CONTINUOUS INK JET PRINTER

[75] Inventors: Michael J. Piatt, Enon; Mark E. Brown, West Carrollton, both of Ohio

[73] Assignee: Eastman Kodak Company, Rochester, N.Y.

[21] Appl. No.: 765,973

[22] Filed: Aug. 15, 1985

[51] Int. Cl.⁴ .............................................. G01D 18/00

[52] U.S. Cl. ........................................ 346/1.1; 346/75

[58] Field of Search .................................. 346/1.1, 75

[56] References Cited

U.S. PATENT DOCUMENTS 3,750,191 7/1973 Naylor, III ........................... 346/75
3,769,630 10/1973 Hill et al. ............................ 346/75
3,866,237 2/1975 Meier .................................. 346/75
3,898,673 8/1975 Naskell ............................... 346/140
4,196,625 4/1980 Kern .................................... 73/304
4,250,510 2/1981 Dressler ............................... 346/75

*Primary Examiner*—E. A. Goldberg
*Assistant Examiner*—Gerald E. Preston
*Attorney, Agent, or Firm*—Thomas H. Close

[57] ABSTRACT

Information relating to the impact position on a catcher face of a deflected ink jet is used to adjust various parameters of an ink jet printing system, such as the charge voltage, the time between orifice plate stimulation and drop charging, etc., or to check the occurrence of malfunctions such as crooked jets, misregistration between the charge plate and the jets, etc. According to the invention, means integral with the catcher cooperate with the ink flowing on the catcher face to vary an electrical property at said catcher face as a function of the portion of that face which is ink wetted. In one embodiment the jet impact position is derived from an electrical resistance measurement. In another embodiment this position is derived from a capacitance measurement.

23 Claims, 9 Drawing Figures

DEVICE AND METHOD FOR SENSING THE IMPACT POSITION OF AN INK JET ON A SURFACE OF AN INK CATCHER, IN A CONTINUOUS INK JET PRINTER

FIELD OF THE INVENTION

The present invention relates to continuous ink jet printing apparatus and more specifically to a device and method for sensing the impact position of an ink jet on a surface of an ink catcher forming part of the printing head of an ink jet printer, for the purpose of identifying several parameters that affect or control the printing process.

DESCRIPTION OF THE PRIOR ART

The term "continuous" has been used in the field of ink jet printer apparatus to characterize the types of ink jet printers that utilize continuous streams of ink droplets, e.g. in distinction to the "drop on demand" types. Continuous ink jet printers can be of the binary type (having "catch" and "print" trajectories for droplets of the continuous streams) and of the multi-deflection type (having a plurality of print trajectories for droplets of the continuous streams). Binary type apparatus most often employs a plurality of droplet streams while multi-deflection apparatus most often employs a single droplet stream.

In general, continuous ink jet printing apparatus have an ink cavity to which ink is supplied under pressure so as to issue in a stream from an orifice plate in liquid communication with the cavity. Periodic perturbations are imposed on the liquid stream (e.g. vibrations by an electro-mechanical transducer) to cause the stream to break up into uniformly sized and shaped droplets. A charge plate is located proximate the stream break-off point to impart electrical charge in accord with a print information signal. A catcher surface is provided to catch non-printing droplets. These droplets are sent back to the ink supply system of the ink jet printing apparatus for recycling. The other droplets impact a receiving sheet, made of paper for example, to print an information on this sheet.

Thus it appears that ink jet printing involves an accurate control of the paths of both the printing and non-printing droplets. Accuracy is of primary importance since a deflection of a few minutes of arc of the path of the printing jet may result in a not readable printed character. Also it is extremely important to keep an accurate control of the path of the non-printing droplets, which must be properly deflected to the catcher. This deflection is dependent upon many variables such as the charge voltage on the charge plate, mechanical alignment, the jet stimulation amplitude to break the jet into droplets, the charge-to-stimulation phase difference, the straightness of the jets and the pressure of the ink in the cavity. It may happen also that the jet is non-voluntarily deflected, or crooked, for example because of the presence of a solid particle partially clogging the orifice through which the ink is forced out of the ink cavity.

Thus it appears that it is important to check the operation of the jet forming and deflecting means acting on the fluid jet of droplets so as to feed back these means with correction signals, for example, or to check the jet position so as to detect the occurrence of a crooked jet and to excite, in answer, cleaning means acting on the orifices through which the ink is forced out.

In the prior art, some such checking, sensing and controlling operations were performed, non automatically, at a separate station with separate sensors which add to the cost and to the space requirement of the ink jet printer.

SUMMARY OF THE INVENTION

The purpose of this invention is to solve the problem of checking the position of an ink jet in ways that avoid the disadvantages of the prior art approach. Thus one significant objective of the present invention is to provide, in ink jet printing apparatus, improved means for sensing the jet position in an ink jet printer without separate additional structures.

These objects are achieved in accordance with the invention by providing an ink jet printer with a device for sensing the impact position of an electrically conductive ink jet on the vertical face of an ink catcher extending generally parallel to the ink jet forming part of the printing head of the printer, the improvement comprising (a) means integral with the catcher and associated with said vertical face so as to exhibit an electrical property varying as a function of the portion of that vertical face which is wetted by the ink flowing downstream of the impact position of the jet and, (b) means for sensing said electrical property and for deriving therefrom a signal representative of the jet impact position.

The invention also provides a method for sensing the impact position of an ink jet on the vertical face of an ink catcher forming part of the printing head of an ink jet printer, comprising the steps of:

(a) varying an electrical property at said catcher face as a function of the portion of that surface which is wetted by the ink flowing downstream of the impact position of the jet and, (b) sensing said electrical property and deriving therefrom a signal representative of the jet impact position.

The present invention provides significant advantages in that the use of the catcher surface itself to perform some of the sensing operations is cost effective and requires less space than the separate sensors used in the prior art. Also it provides the ability to measure what portion of the catcher surface is being wet by the ink. The device can be made to be very reliable and to require no calibration. There is no problem of sensor alignment because the catcher surface always remains registered to the jet or jets. Furthermore the device provides a direct measurement of the jet deflection, identifying the end results of all the interactions (charge voltage, mechanical alignment, jet stimulation, charge-to-stimulation phase difference, straightness of the jets, ink cavity pressure, etc.) influencing the jet impact position on the catcher surface.

BRIEF DESCRIPTION OF THE DRAWINGS

The subsequent description of preferred embodiments of the present invention refers to the attached drawings wherein.

DESCRIPTION OF THE PREFERRED EMBODIMENTS

Figure 1:
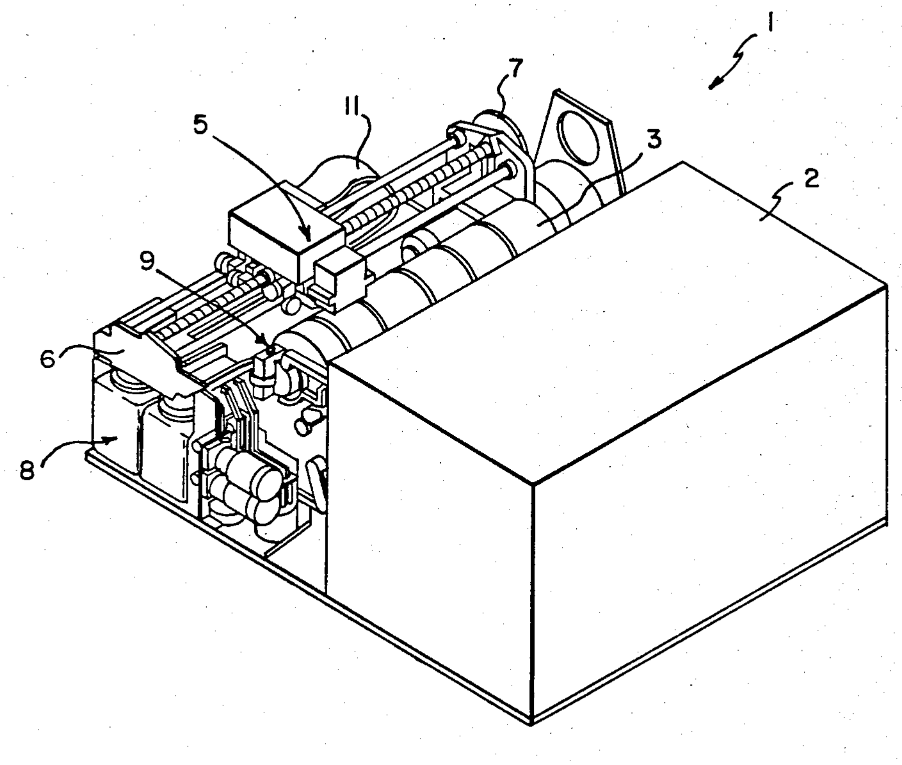
FIG. 1 is a perspective view of an ink jet printer embodiment employing the present invention.

FIG. 1 illustrates schematically an exemplary ink jet printing apparatus 1 comprising a sensing device according to the present invention. In general, the apparatus 1 comprises a paper feed and return sector 2 from which sheets are transported into and out of operative relation on printing cylinder 3. The detailed structure of those components do not constitute a part of the present invention and need not be described further. Also illustrated generally in FIG. 1 is the apparatus print head assembly 5 which is mounted for movement along carriage assembly 6 by appropriate drive means 7. During printing operation the print head assembly is traversed across a print path in closely spaced relation to a print sheet which is rotating on printing cylinder 3. Ink is supplied to and returned from the print head assembly by means of flexible conduits 11 which are coupled to ink cartridges 8. A storage and start up station 9 is constructed adjacent the left side (as viewed in FIG. 1) of the operative printing path of print head assembly 5 and the drive means 7 and carriage assembly 6 are constructed to transport the print head assembly 5 into operative relations with storage and start up station 9 at appropriate sequences (e.g. storage and start up) of the operative cycles of apparatus 1.

Figure 2:
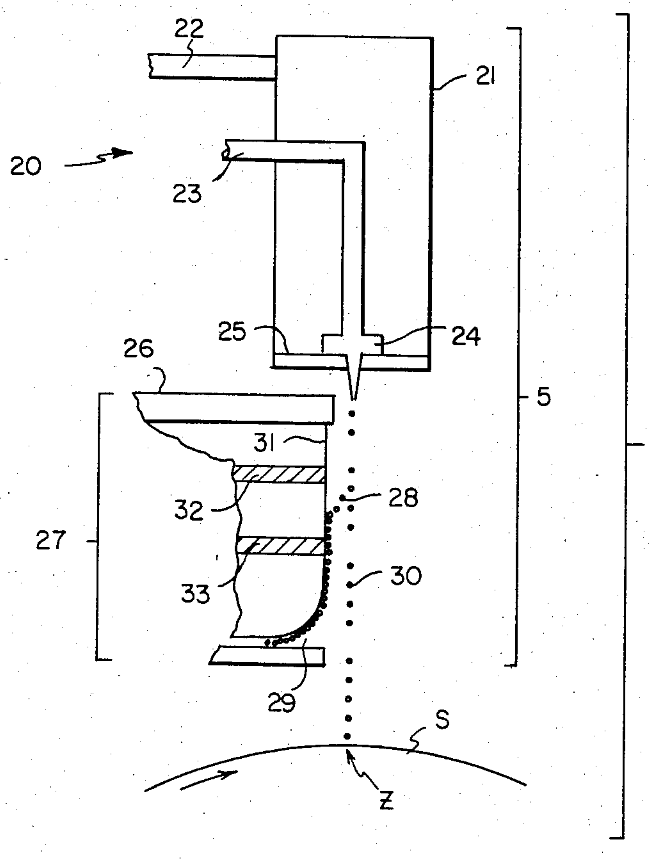
FIG. 2 is a partial enlarged cross-sectional view of the print head assembly of the printer shown on FIG. 1, incorporating one embodiment of the sensing device according to the present invention, the operation of which is based on a resistance measurement.

Referring to FIG. 2, one embodiment of print head assembly 5 embodying the sensing device according to the present invention can be seen in more detail. The assembly 5 includes an upper print head portion 20 including a print head body 21 mounted on housing 22 and having an inlet 23 for receiving ink. The print head body 21 has a passage leading to a print head cavity 24 and an outlet (not shown), leading from the print head cavity 24 to an ink recirculation system. The upper print head portion also includes an orifice plate 25 and suitable transducer means (not shown) for imparting mechanical vibration to the print head body 21. Such transducer can take various forms known in the art for producing periodic perturbations of the ink filament(s) or jet(s) issuing from the orifice plate 25 to stimulate break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 26 constructed to impart desired charge upon ink droplets at the point of filament break-up and a drop catcher 27, having a vertical catcher face 31 extending generally parallel to the ink jet, that is constructed and located to catch non-printing charged droplets 28 (in this arrangement charged droplets). Exemplary preferred charge plate constructions are disclosed in U.S. application Ser. No. 517,608, entitled "Molded Charge Electrode Structure" and filed July 27, 1983 in the name of W. L. Schutrum and in U.S. Pat. No. 4,223,321; however, other charge plate constructions are useful in accord with the present invention. Exemplary drop catcher configurations are described in U.S. Pat. Nos. 3,813,675; 4,035,811 and 4,268,836; again other constructions are useful.

During the printing operation ink filaments or jets are ejected through the orifices in orifice plate 25 and, under the influence of the transducer on print head body 21, break up into streams of uniformly sized and spaced droplets. The charge plate 26 is located proximate the zone of filament break-up and is adapted to selectively charge or not charge each droplet in each of the streams in accordance with information signals respectively transmitted to the various charge sectors of the charge plate. These droplets are collected by a gutter 29 as a continuous flow of ink and recirculated back to the ink print head, while uncharged droplets 30 pass on to the print substrate S as it rotates through the droplet impact zone Z of the apparatus.

As mentioned above, the deflection of the charged droplets 28, and therefore the droplet impact position on the drop catcher 27, depends upon a variety of factors: charge voltage, mechanical alignment, ink jet stimulation, charge to stimulation phase difference, straightness of the jet, ink cavity pressure, etc., which must be monitored and/or controlled to insure a correct operation of the printing head. Locating the droplet impact position on the drop catcher 27 would permit identification of the end result of the interactions between all these factors. Also, if all but one of the dependent factors can be fixed, locating the droplet impact position on the drop catcher 27 would permit measurement of the unknown factor.

Figure 3:
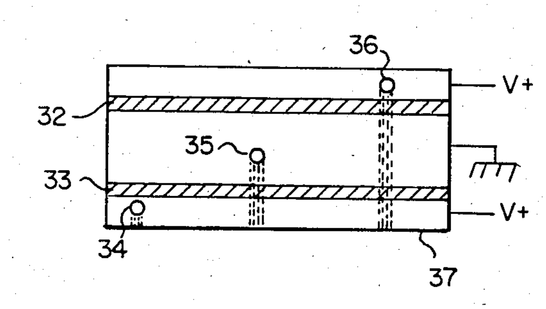
FIG. 3 is a front view of a catcher surface forming part of the device built in the head assembly of FIG. 2.

For the purpose of sensing this position, the present invention provides, in the FIG. 2 embodiment, means integral with the drop catcher 27 and associated with an ink catcher face 31 so as to exhibit an electrical property varying as a function of the portion of that surface which is wetted by the ink flowing downstream of the impact position of the ink jet. The jet impact position is derived from a measurement of the electrical conductivity between two points on the ink catcher face 31. The ink catcher face 31 is made of a conductive material. Two thin insulating plates (32, 33) divide ink catcher face 31 into three regions. It can be determined if there is an electrically conductive ink on the ink catcher face 31 within a given region by a measurement of the resistance across each of the insulating plates. The measurement will determine if there is ink bridging the insulating plates 32 or 33 and forming a closed circuit. With two insulating plates 32 and 33 built into the catcher face, one can resolve three droplet impact regions by simultaneously measuring for continuity across both insulating plates as shown in FIG. 3, where three different jet impact positions 34, 35 and 36 are shown on the ink catcher face 31. The electrical conductivity between two adjacent regions of this catcher face can be checked by connecting, for example, the middle region to ground and the extreme regions to a voltage supply V+, and by using conventional conductivity or resistance measuring circuits. An exemplary such circuit will be described later in connection with FIG. 8. The insulating plates 32 and 33 are advantageously made from a low surface adhesion material, such as Teflon (a registered trade mark of Du Pont de Nemours), to prevent a stationary ink bridge across each plate after the stream of droplets has changed.

Figure 4:
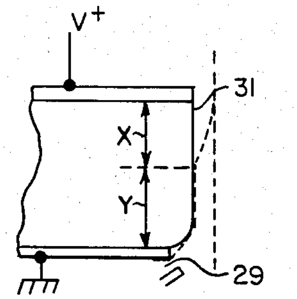
FIG. 4 is a schematic view of another embodiment of the device according to the present invention, based on a analog resistance measurement.
Figure 5:
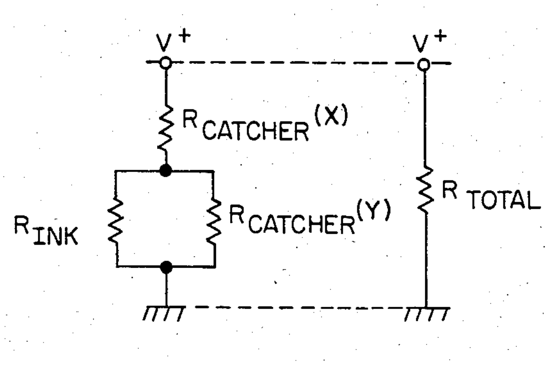
FIG. 5 is an electric diagram useful to explain the operation of the FIG. 4 embodiment.

FIG. 4 shows schematically another embodiment of the device according to the invention, allowing a better resolution of the ink jet impact position than those obtained with the embodiment of FIG. 2 and 3. The ink catcher face 31 is made of a material such as carbon filled epoxy or conductive plastic having an electrical resistance greater than that of the ink, so as to work as an analog jet position sensor. The upper edge of the ink catcher is in contact with an electrode connected to an electric voltage supply V+ while the lower edge of the ink catcher face 31 is in contact with an electrode connected to ground. The droplet impact point will determine the total resistance $R_{total}$ from the top to the bottom of the catcher, as shown by the equivalent resistance diagram shown on FIG. 5. Let (X+Y) be the total height of the ink catcher face 31 and Y the length of the flow of deflected ink on the ink catcher face 31. It appears that the resistance $R_{ink}$ (Y) of the ink flowing on the ink catcher face 31 parallels the resistance $R_{catcher}$ (Y) of the part which is wetted by the ink. Resistance $R_{catcher}$ (X) of the part of the ink catcher face 31 above the jet impact position is in series with the two resistances in parallel. Therefore if $R_{ink}$ (Y) $R_{catcher}$ (X):

$$R_{total} \simeq R_{catcher} (X)$$

Thus the X position of the jet impact can be derived from a measurement of the total resistance between the electrodes of the ink catcher face 31, by means of the FIG. 8 circuit, for example, to be described later.

A suitable material for the ink catcher face 31 is one exhibiting a surface resistivity of about $6 \times 10^6$ ohms/square inch (surface resistivity is defined in ASTM Standard D 257-61). This number is greater than the thin film resistance of the ink currently used in the ink jet printers made by DICONIX, formerly Mead Digital Systems, a subsidiary of Eastman Kodak Company.

Figure 6:
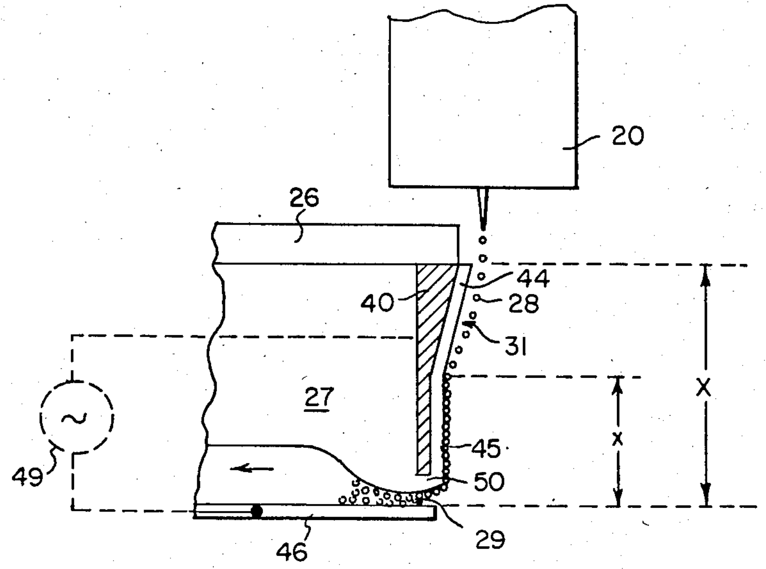
FIG. 6 is an enlarged, partial and cross-sectional view of another print head assembly for the printer shown on FIG. 1, incorporating a further embodiment of a sensing device according to the present invention, based on a capacitance measurement.

FIG. 6 shows schematically a further embodiment of the sensing device according to the present invention. Broadly speaking, the ink catcher face 31 is made into a parallel plate capacitor. One of the plates of the capacitor is the thin ink film formed by the deflected droplets that impact the catcher and flow down to the gutter 29 for recycling. As the ink jets impact higher on the ink catcher face 31, due to more drop deflection, the size (length) of the plate formed by the ink stream is increased. This results in a corresponding increase in the capacitance between a fixed catcher electrode 40 and the ink itself.

The jets exit from the upper print head portion 20 of the print head assembly and break up into charge droplets 28 as they pass in front of the charge plate 26. These charged droplets are deflected toward the ink catcher face 31 which is coated with an insulating material 44 over the area of the fixed catcher electrode 40 that the jets impact. The thickness of the insulating material 44 is between 0.04 and 0.06 mm. The fixed catcher electrode 40 may be molded into a nonconductive plastic catcher, or, alternatively an insulating coating may be applied over a conductive catcher face, the body of the catcher itself forming the fixed catcher electrode 40. The insulating material extends all the way up to charge plate 26 to avoid the possibility of an ink short to electrode 40. After impact, the ink flows down the ink catcher face 31 forming a conductive fluid film 45 on that face. Next, ink contacts a conductive catch pan 46 which is attached to the bottom of the drop catcher 27 so as to form one side wall of an ink gutter 29. This conductive catch pan 46 also acts as an electrode and provides a point of attachment for a lead wire that is in electrical contact with the fluid film 45 on the ink catcher face 31. The fluid is evacuated from the back of the ink gutter 29 and returned to the ink system to be used again.

Fixed catcher electrode 40 located behind the insulating material 44 forms the other electrode of a parallel plate capacitor (40, 44, 45). By connecting an A.C. voltage supply 49 between, electrodes 46 and 40, the capacitance of this capacitor can be measured by standard techniques. Alternatively, this capacitance can also be measured by means of the FIG. 8 circuit, to be described later. The higher the jet impact point on the ink catcher face 31, the more capacitance between electrodes 46 and 40.

The insulating material 44 between the conductive fluid film 45 on the ink catcher face 31 and the fixed catcher electrode 40 must be thin in order to produce a capacitance of acceptable value for accurate measurement. It is also necessary that the insulating material in zone 50 between the conductive catch pan 46 and the fixed catcher electrode 40 be of significantly greater thickness (about 10 times as thick) than that of the insulating material 44 between the fixed catcher electrode 40 and the conductive fluid film 45 on the ink catcher face 31. This minimizes the offset capacitance between fixed catcher electrode 40 and conductive catch pan 46, thereby increasing the sensitivity of the jet impact sensing device according to the invention.

Figure 7:
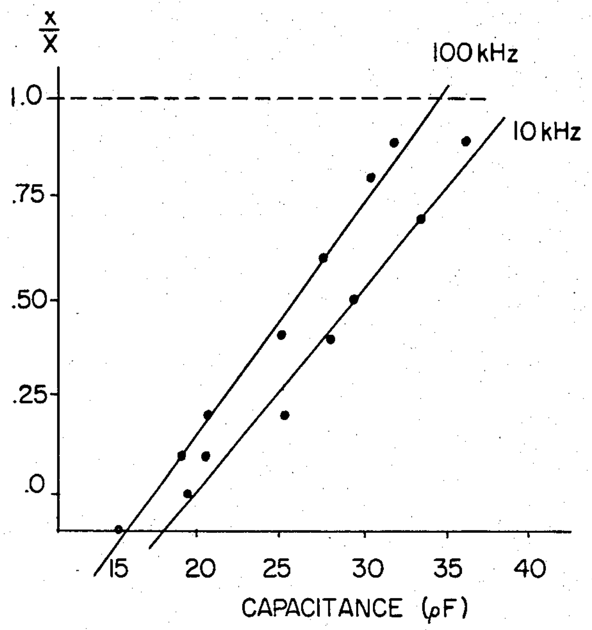
FIG. 7 is a graph useful to explain the operation of the FIG. 6 embodiment.

FIG. 7 shows a graph of capacitance versus catcher impact point for a linear array of jets impacting the ink catcher face 31 coated with a 0.05 mm thick layer of polyimid insulation material sold by DuPont deNemours under the trade name Kapton, in the sensing device of FIG. 6 where this insulation material covered an electrode 40 of copper. Conductive catch pan 46 was made of stainless steel. Using an A.C. voltage supply 49 connected between fixed catcher electrode 40 and conductive catch pan 46 and a conventional capacitance measuring instrument, the graph provides the x/X position of the jet impact points where:

x is the average height of the impact points
X is the maximum height of the impact points.

It should be noted that for a given frequency of the A.C voltage supply 49, the relationship between x/X and the measured capacitance is substantially linear. FIG. 7 shows two graphs corresponding respectively to frequencies of 10 kHz and 100 kHz.

It is thus possible to detect the impact point of even a single jet. The device provides the capability of setting charge voltage to the required level in order to obtain a predetermined jet deflection.

During normal printing operation, conductive catch pan 46 and fixed catcher electrode 40 are grounded to avoid charge build up on the catcher face induced by the charge of the fluid impacting the catcher.

Figure 8:
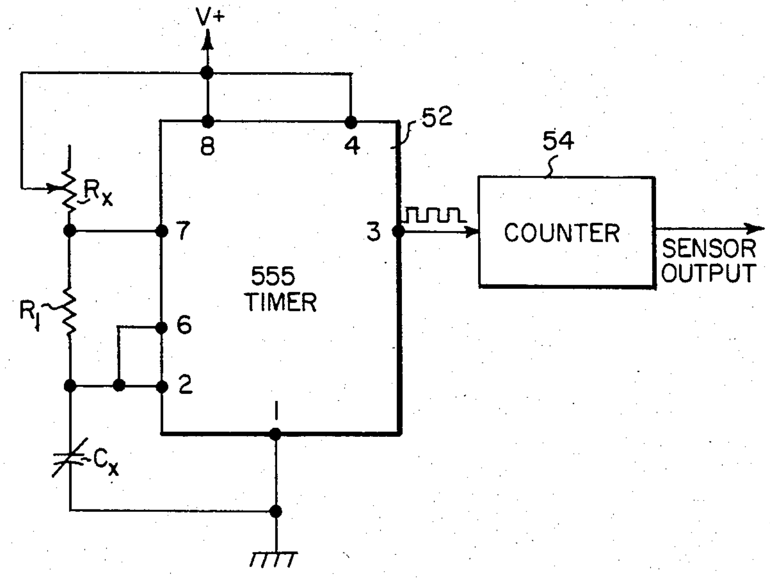
FIG. 8 is an examplary electronic circuitry to be used in the sensing device of the present invention.

FIG. 8 shows a versatile dual resistance or capacitance measuring circuit which can be used in connection with any of the above described embodiments of the sensing device according to the invention. The circuit is based on the use of the well-known 555 integrated circuit mounted as a timer. As shown on FIG. 8, a DC supply within the (+5V, +15V) range is connected to the V+terminal 8 and reset terminal 4 of the 555 timer 52. Between v+terminal 8 and ground terminal 1 of the timer, capacitor $C_x$, resistor $R_1$ and resistor $R_x$ are connected in series. The common terminal of $R_x$ and $R_1$ is connected to the discharge terminal 7 of the 555 timer. Trigger terminal 2 and threshold terminal 6 of the timer are connected to the common terminal of $R_1$ and $C_x$. Substantially square pulses are delivered on output terminal 3 of the 555 timer, the frequency F of which is related to $R_x$ and $C_x$ according to the following formula:

$$F=0.7\ ((R_x+2Ri)\ C_x)$$

A counter 54 fed by these pulses for a predetermined time provides a signal the variations of which are related to either $R_x$ or $C_x$ variations, or both.

This circuit can be used, for example, with the FIG. 4 embodiment of the above described sensing device to measure resistance $R_{total}$, $R_{total}$ being substituted for $R_x$, and $C_x$ being fixed. With the FIG. 7 embodiment, $R_x$ is fixed and the variable capacitor (40, 44, 45) is substituted for $C_x$.

The sensing device or sensor according to the present invention can be used to perform a variety of measurements and/or settings implied by the operation of an ink jet printer of the continuous type.

For example, the sensor device or sensor can be used to adjust charge voltage at start up to obtain the desired catch impact point. This can be done for each jet independently, or for the average of the entire array of jets. Also, as the jet impact is a measure of drop deflection, the impact sensor can be used to adjust the time between the orifice plate stimulation and the actual drop charging for synchronous printing applications.

The catcher impact sensor can also be used to identify crooked jets that impact at a position different from the average array impact point.

Furthermore, the resonator ink pressure can be set to give a jet velocity that will result in a predetermined catcher impact point for a given charge/deflection setup.

Mechanical registration between the charge plate and the jets is extremely critical. Some dimensions must be held to 2 μm tolerance. The catcher impact sensor can adjust the charge voltage to correct for mis-registered parts both during assembly and operation. This problem can be the result of many factors. Among others, thermal expansion between parts can cause errors in this tolerance range.

As a measurement device, the catcher impact sensor can be used to determine fluid parameters such as density, viscosity, and electrical conductivity. This is accomplished by using the sensor with a known charge and deflection setup. The amount of deflection can be related to a number of fluid properties.

Droplet time of flight can be determined by relating the drop charging interval to the time of impact on the catcher face. The distance between the catcher impact point and the charge electrode can provide the drop velocity information.

Some information about jet stimulation can also be derived from the sensor. When a jet is stimulated with certain amplitudes, small satellite drops are formed between the larger primary drops. The satellites, having less inertia than the primary drops, are electrostatically deflected toward the catcher at a relatively low charge voltage. The impact of the satellite drops is determined while the larger primary drops miss the catch surface.

Figure 9:
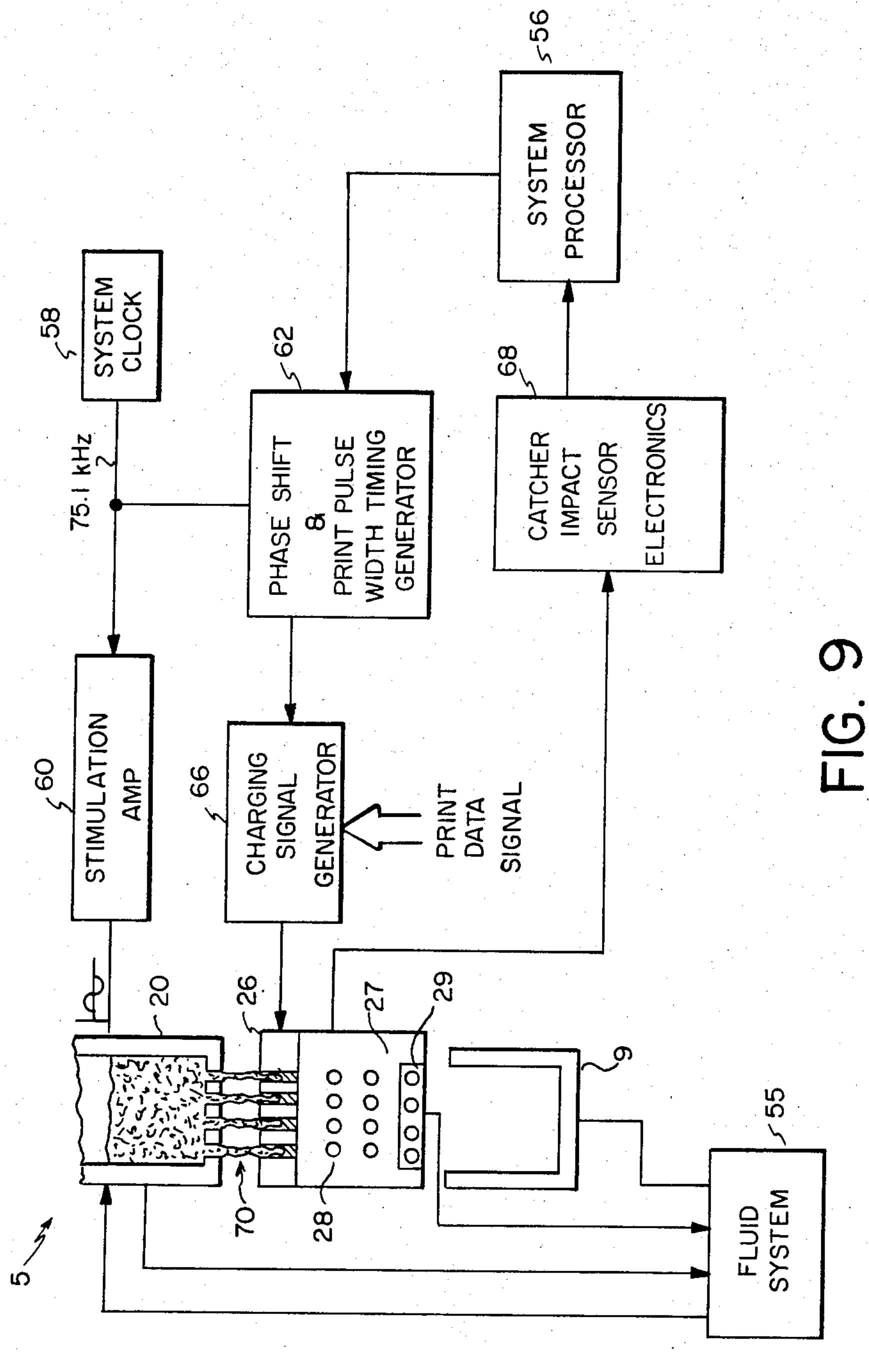
FIG. 9 is a block diagram illustrating the control system of the ink jet printer shown in FIG. 1.

Some examples of the use of the catcher impact sensor in an ink jet printer according to the present invention will now be described with reference to FIG. 9. FIG. 9 shows a cross sectional schematic view of a print head assembly 5, having an upper print head portion 20, and a lower portion including a charge plate 26 and a drop catcher 27. The print head assembly 5 is shown located adjacent a storage and start up station 9. A fluid system 55 is hydraulically coupled to the print head assembly 5 and the storage and start up station 9. The ink jet printer is controlled by a system microprocessor 56. A system clock 58 generates a 75.1 KHz stimulation signal that is applied to the upper print head portion 20 via a stimulation amplifier 60. The 75.1 KHz stimulation signal is also supplied to a phase shift and print pulse width timing generator 62, that supplies, under control of system processor 56, print pulse timing signals to a charging signal generator 66. The charging signal generator 66 also receives a print data signal and generates the jet charging signals that are applied to drop charging electrodes in charge plate 26. Catcher impact sensor electronics 68, comprising for example a 555 timer and counter as shown in FIG. 8, generates the drop impact position signal from the drop catcher 27 and supplies the signal to system microprocessor 56.

In the first example to be described, the catcher impact sensor is used to adjust the phase relationship between the stimulation signal, which is derived directly from the system clock 58 through stimulation amplifier 60 and the jet charging signal, which is controlled by the system microprocessor 56.

The stimulation signal of 75.1 KHz is applied to the upper print head portion 20 from the stimulation amplifier 60. This produces plane wave stimulation causing all the jet filaments 70 to break up into uniform droplets 28 at nearly the same time across the linear array of jets. The jet break up location is in front of the charge plate 26. The droplets fall past the drop catcher 27 into the storage and start up station 9 to be returned to the fluid system 55. If a narrow charging signal of 1–2 μsec. duration is applied to the charging electrodes in the charge plate 26 from the charging signal generator 66, then only those droplets will be deflected into the drop catcher 27 that separated during the narrow charging signal. These droplets return to the fluid system 55 through the gutter 29 located at the bottom of the drop catcher 27. A charging pulse of 1–2 μsec. is about 10% of the stimulation period of 13 μsec. derived from the 75.1 KHz frequency. Although the exact time of droplet formation is unknown, it is known that it happens nearly instantaneously for each ink jet once each stimulation cycle. Also, it is known that the filament break up time for each ink jet is repeatable from one stimulation cycle to the next over an extended period of time but the exact time may vary from jet to jet. Changes in the ink viscosity or pressure are two variables that can effect the jet break up time in the stimulation cycle.

Given this background information, the use of the catcher impact sensor to set the time between stimulation and charging can be effected as follows. First, the printing head 5 is located over the storage and start up station 5 and no charging voltage is applied to the charge plate 26, so that none of the jets are deflected into the drop catcher 27, and the output of catcher impact sensor electronics 68 is monitored to establish a base line output value. Next a narrow (1–2 μsec.) charging pulse of approximately 150 volts is applied to the charging plate 26 from charging signal generator 66. The phase shift and print pulse width timing generator 62 is used to vary the time in the stimulation cycle that the charging pulse is applied to the charge plate 26. The system microprocessor 56 sweeps the time that the charging pulse is applied to the charge plate through the entire stimulation cycle. This is done at discrete phase increments of the stimulation cycle. The charging pulse is applied at the same phase orientation for several stimulation cycles. This provides time for the catcher impact sensor to respond at each phase setting. When a phase angle is encountered that causes one or more of the jets to impact the drop catcher 27, as measured by the catcher impact sensor electronics 68, it is known to be the instant of droplet formation for those jets in the stimulation cycle. This is true because only charged droplets will be deflected toward the drop catcher 27. Droplets only receive charge if voltage is present at the charging electrodes on charge plate 26 at the time of droplet formation. As the charging pulse is phase shifted across the stimulation cycle, a maximum output value will be obtained from the catcher impact sensor electronics 68, then the output will return to the base line value. The phase is set between the main value and the point of return to the base line value. This method of determining phase by phase shifting a narrow charging pulse across the stimulation cycle and monitoring the jet is the subject of copending patent application Ser. No. 765,974.

After determining the proper phase setting for drop charging as described above, the print pulses delivered by the timing generator 62 to the charging signal generator 66 are timed with the droplet break off. The system microprocessor 56 performs this function and stores the result before printing begins and periodically during operation.

In the next example, the catcher impact sensor is used to adjust the charge voltage provided by the charging signal generator 66. The stimulation signal is applied by the stimulation amplifier 60 to the print head body 20 causing the jet filaments 70 to break up into droplets 28 in front of the charge plate 26. A DC voltage is applied to the charge plate 26 by the charging signal generator 66 which is controlled by the system microprocessor 56. The jet deflection toward the drop catcher 27 is proportional to the applied charge voltage which induces a net charge on the ink droplets. If the charge voltage is applied continuously, then the same charge is induced on all the droplets independent of the filament breakup time in the stimulation cycle. The system microprocessor 56 controls the charge voltage from the charging signal generator 66 to charge plate 26 by slowly increasing the voltage in discrete increments. The output of the catcher impact sensor electronics 68 is recorded by the system microprocessor 56 until a threshold value is reached that corresponds to a catcher impact location that gives good print quality. The charge voltage is then held at this value during the printing cycle. Note that it is possible to determine the proper charge/stimulation phase setting as described above after the operating charge voltage has been determined.

The final example will describe how the catcher impact sensor is used to identify crooked jets. This operation is also performed over the storage and start up station 9 by deflecting the jets onto the drop catcher 27 one at a time. One method involves adjusting the charge voltage until a reference output is obtained from the catcher impact sensor electronics 68, for each jet. The variation in required charge voltage for all of the jets is a good indication of jet array straightness. At the cost of increased complexity of the charging signal generator 66, each jet can be operated at a different optimum charge voltage to improve print quality. This operation is repeated after printing for some duration, to detect the development of crooked jets. If crooked jets are detected, then the print head assembly 5 is shut off and cleaned by any one or more known techniques.

To determine the presence of crooked jets while printing, the output of catcher impact sensor electronics 68 is monitored by the system microprocessor 56 during a time when all of the jets are deflected to the catcher, for example while paper is being loaded and unloaded from the printing cylinder 3 (see FIG. 1). If the average catcher impact sensor output from the entire array changes with time, this would indicate that one or more jets were crooked, causing them to impact higher or lower on the catcher face. Note that checking the average impact of the entire jet array does not provide information about a single jet impact location. If a problem is detected by measuring the entire array, then individual jets can be checked at the storage and start up station 9 as described above.

Thus it will be appreciated that the present invention provides for a sensing device useful to get information about the most important parameters of an ink jet printer operation. It is apparent that the use of a sensor made integral with the ink catcher face itself is cost effective and requires less space than a separate sensor performing the same function. The jet impact position sensitive catcher is unique because it provides the ability to measure what portion of the catcher is being wet by the conductive ink. The device according to the invention can be made to be very reliable and to require no calibration. There is no problem with sensor alignment because the catcher face always remains registered to the jet curtain. The most obvious advantage of this device is that it provides a direct measurement of jet deflection.

In summary, since it is the goal of the ink-jet system to either print the drops or catch them, information which defines the ability to catch the drops is extremely valuable. The ability to catch deflected drops is dependent upon many variables such as the charge voltage, mechanical alignment, jet stimulation, the charge-to-stimulation phase difference, the straightness of the jets, and the image bar pressure, to name a few. One measurement which identifies the end result of the interactions between all of these variables is advantageous.

If, on the other hand, all but one of the dependent variables can be fixed, then the catcher impact sensor can measure the unknown parameters independently. This mode of operation can also be very useful.

The invention has been described in detail with particular reference to preferred embodiments thereof, but it will be understood that variations and modifications can be effected within the spirit and scope of the invention.

We claim:

1. Device for sensing the impact position of an electrically conductive ink jet on the vertical face of an ink catcher extending generally parallel to the ink jet and forming part of the printing head of an ink jet printer, characterized by:

(a) means integral with the catcher and associated with said catcher face so as to exhibit an electrical property varying as a function of the portion of the face which is wetted by the ink flowing downstream of the impact position of the jet and, (b) circuit means for sensing said electrical property and for deriving therefrom a signal representative of the jet impact position.

2. Device according to claim 1, characterized in that said circuit means is configured and connected to said integral means so as to sense the electrical impedance of said integral means.

3. Device according to claim 2, characterized in that said inegral means comprises an electrically conductive catcher face and a plurality of insulating means dividing the catcher face into a plurality of conductive areas, and in that said circuit means is configured and connected to these areas for detecting which insulating means are short-circuited by the ink flowing over the catcher face, so as to determine the particular area where the ink jet is impacting.

4. Device according to claim 3, characterized in that said insulating means are made of a low surface adhesion material for preventing a stationary ink bridge after the stream of ink has changed.

5. Device according to claim 2, characterized in that said integral means comprises a catcher face material exhibiting a surface resistivity greater than the one of a thin layer of ink flowing over the catcher surface and in that said circuit means derives, from a measurement of the total resistance of the ink-wetted catcher surface, an analog measurement of the ink jet impact position.

6. Device according to claim 2, characterized in that said integral means is comprised of an electrode embedded in the catcher and substantially parallel to the catcher face, an insulating material covering said catcher face so as to form a capacitor when a thin layer of conductive ink, forming a second electrode is flowing over that catcher face, and in that said circuit means is configured and electrically connected to the electrodes for measuring the capacitance of the capacitor and for deriving therefrom the surface of the ink layer electrode and the position of the ink jet impact.

7. Device according to claim 6, characterized in that said ink layer electrode is electrically connected to said circuit means through a metal pan forming one wall of a gutter collecting the ink impacting the catcher face.

8. Device according to any of claims 2 to 6, characterized in that said circuit means is comprised of a 555 integrated circuit mounted as a timer and delivering pulses at a frequency $F=0.7\ ((R_x+2R_1)C_x)$, $R_x$ and $C_x$ being respectively the jet impact position variable resistor or capacitor to be measured and $R_1$ being a reference resistance.

9. A method for sensing the impact position of an ink jet on the vertical face of an ink catcher extending generally parallel to the ink jet and forming part of the printing head of an ink jet printer, comprising the steps of:

(a) varying an electrical property at said catcher face as a function of the portion of that face which is wetted by the ink flowing downstream the impact position of the jet and, (b) sensing said electrical property and deriving therefrom a signal representative of the jet impact position.

10. A method according to claim 9, wherein the variable electrical property is an electrical impedance.

11. A method according to claim 9, wherein the variable electrical property is an electrical capacitance.

12. A continuous ink jet printing apparatus, including means for adjusting the phase relations between the stimulation and charging of the ink jet, characterized by:

means for sensing the impact of the ink jet on a vertical face of an ink catcher extending generally parallel to the ink jet to product an impact signal;

means for generating and applying a narrow jet charging signal;

means for shifting the phase of the narrow jet charging signal with respect to a stimulation signal; and means responsive to the impact signal for detecting the phase at which the ink jet impacts the face of the ink catcher.

13. The ink jet printing apparatus claimed in claim 12, characterized in that said means for sensing the impact of the ink jet on the face of the ink catcher, includes means for exhibiting a variable electrical property as a function of the portion of the face that is wetted by the ink and means for sensing the variable electrical property.

14. A method for determining the proper phase relationship between the stimulation and charging of a ink jet in a continuous type ink jet printer of the type having a print head with an ink catcher having a vertical face extending generally parallel to the ink jet; characterized by the steps of:

generating and applying a narrow jet charging signal to the ink jet;

shifting the phase of the narrow jet charging signal with respect to a stimulation signal; and sensing the phase at which the ink jet first impacts the face of the ink catcher to determine the proper phase relationship.

15. A continuous ink jet printing apparatus of the type having a print head with an ink catcher having a vertical face extending generally parallel to the ink jet, including means for adjusting ink drop charging voltage, characterized by:

means for sensing the impact position of the ink jet on the vertical face of the catcher to produce an impact position signal;

means for generating and applying a varying charge voltage to the ink jet; and means responsive to the impact position signal for detecting the charge voltage at which the impact position signal reaches a predetermined value corresponding to a good print quality.

16. The ink jet printing apparatus claimed in claim 15, characterized in that said means for sensing the impact position of the ink jet on the vertical face of the ink catcher includes means for exhibiting a variable electrical property as a function of the portion of the surface that is wetted by the ink, and means for sensing the variable electrical property.

17. A method for determining ink drop charging voltages in a continuous ink jet printer of the type having a print head with an ink catcher having a vertical face extending generally parallel to the ink jet, characterized by the steps of:

generating and applying a varying charge voltage to the ink jet; and sensing the charge voltage at which the ink jet is deflected to a predetermined position on the vertical face of the ink catcher.

18. A multi-jet continuous ink jet printing apparatus of the type having a print head with an ink catcher having a vertical face extending generally parallel to the ink jet including means for sensing ink jet array straightness characterized by:

means for sensing the impact position on an ink jet on the vertical face of the ink catcher to produce an impact position signal;

means for generating and applying a varying voltage to the ink jets, one at a time;

means responsive to the impact position signal for detecting the charge voltage at which the impact position signal reaches a predetermined value for each ink jet; and means responsive to the variation in detected charge voltages for the multiple ink jets for producing a signal representing ink jet array straightness.

19. The multi-jet continuous ink jet printing apparatus claimed in claim 18, characterized in that said means for sensing the impact position of the ink jet on the vertical face of the ink catcher includes means for exhibiting a variable electrical property as a function of the portion of the surface of the vertical face that is wetted by the ink, and means for sensing the variable electrical property.

20. A method for determining ink jet array straightness in a multi-jet continuous jet printer of the type having a print head with an ink catcher having a vertical face extending generally parallel to the ink jet, characterized by the steps of:

generating and applying a varying charge voltage to the ink jets, one at a time;

detecting the charge voltage for each jet that causes the jet to impact the vertical face of the ink catcher at a predetermined position; and sensing the variation in detected charge voltage as a measure of ink jet array straightness.

21. Continuous ink jet printing apparatus of the type having a print head with an ink catcher having a vertical face extending generally parallel to the ink jet including means for sensing a crooked ink jet while printing, characterized by:

means for sensing the average position of the impact of ink jets on the vertical face of the ink catcher during a period when all of the ink jets are being deflected into the catcher; and means for detecting a change of the average impact position over time to indicate a crooked ink jet.

22. The ink jet printing apparatus claimed in claim 21, characterized in that the means for sensing the average position of impact of ink jets on the vertical face of the ink catcher includes means for exhibiting a variable electrical property as a function of the portion of the surface that is wetted by the ink, and means for sensing the variable electrical property to produce a signal representing the average impact position.

23. A method of sensing a crooked ink jet while printing, in a multi-jet ink jet printing apparatus of the type having a print head with an ink catcher having a vertical face extending generally parallel to the ink jet, characterized by:

sensing the average position of impact of ink jets on the vertical face of the ink catcher during a period when all of the ink jets are deflected onto the catcher, and detecting a change in the average position over a period of time.

* * * * *